March 29, 1960   J. C. LONDON ET AL   2,930,249
SPRING-LOADED VALVES FOR FLUID FLOW CONTROL
Filed July 10, 1958
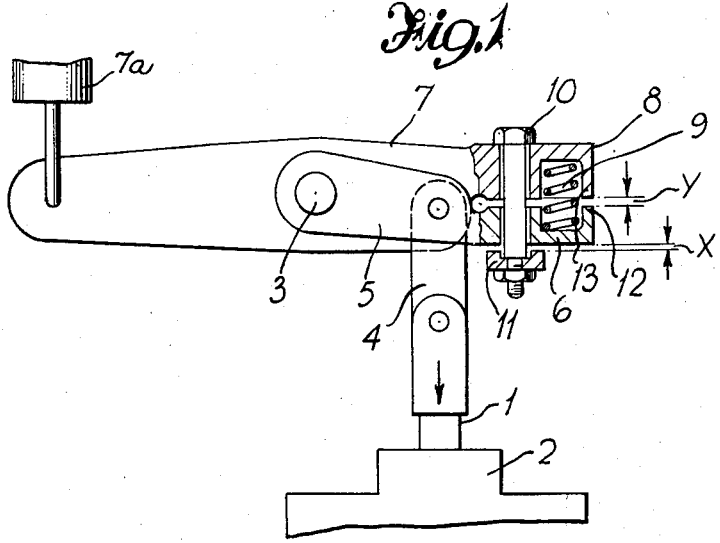
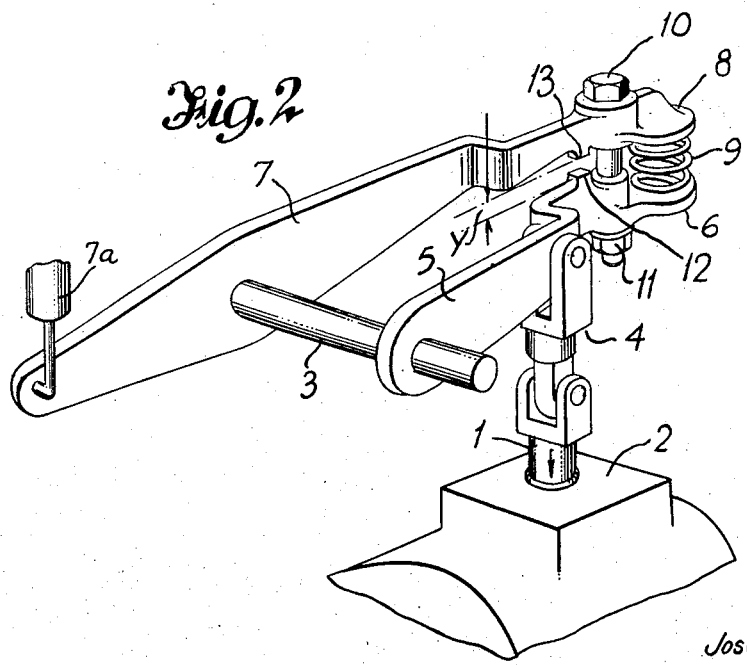
INVENTORS
JOSEPH CLARE LONDON
JOHN GARLAND
Norris & Bateman
ATTORNEYS

United States Patent Office

2,930,249
Patented Mar. 29, 1960

2,930,249
SPRING-LOADED VALVES FOR FLUID FLOW CONTROL

Joseph Clare London, Hale Barns, Altrincham, and John Garland, Chadderton, England, assignors to Metropolitan-Vickers Electrical Company Limited, London, England, a British company Application July 10, 1958, Serial No. 747,800

Claims priority, application Great Britain July 12, 1957

8 Claims. (Cl. 74—470)

This invention is concerned with lever mechanism for transmitting movement from an operating device to a valve such as used for controlling the flow of steam or other fluids and which is held closed on its seating by the force of spring loading associated with the mechanism.

For valves which are normally closed by the action of a spring, it is customary for the spring to operate at all positions of the valve, from closed to full open. In addition to the spring force, there is usually an additional closing force acting on the valve, when in the closed position, that is caused by the pressure of the fluid being controlled by the valve. It is necessary, therefore, for the operating gear to be strong enough to lift the valve off its seat against the combined action of these two forces, and then be capable of holding the valve in the open position against the continuous force of the spring which is tending to close the valve.

It is desirable to minimise the loads due to these forces as much as possible in order to reduce the size of the operating gear. This is particularly so in such cases where it is necessary to have some form of packing to seal the space between the valve spindle and its guide, in which the increased friction necessitates the use of stronger springs than are required for a valve whose spindle can move freely in its guide.

The object of the invention is to provide a lever mechanism in which the spring load only acts on the valve when the valve is closed, and becomes locked-up or inoperable in the system immediately the valve starts to open, and remains inoperative all the time the valve is open. Thus the operating gear need only be strong enough to deal with the following situations:

(a) Open the valve against the load due to the pressure of the fluid being controlled by the valve;

(b) Apply sufficient force to operate the spring when the valve is closed;

(c) Overcome any friction between the valve spindle and its guide, or any other form of obstruction, within reasonable limits.

The lever mechanism according to this invention comprises two pivoted members one of which is connected to the operating gear and the other is connected to the valve spindle, a loading spring operatively connected between the two members whereby a closing force applied by the operating gear is initially transmitted from the first member to the second member to bias the spindle and valve to a closing position, the two pivoted members having opposing abutments which are normally separated by the spring bias but are brought into contact when the closing force applied to the spring exceeds a predetermined amount, whereby a positive closing force is applied to the valve, and a lost motion connection between the two members which acts to limit the gap between the abutments and absorb the loading force of the spring, whereby when the operating gear is moved in a direction to open the valve, the spring load is removed from the valve and the two members act as a solid unit.

The spring is conveniently so arranged as to be normally in compression though in some cases a normal tension spring may be preferable.

In the operation of the invention, when opening the valve, the two pivoted members become solid and act as one, but when closing the valve, the member connected to the operating gear can only act on the other member through the medium of the spring (normally in compression but not necessarily so). The arrangement is such, however, that in the event of undue friction of the valve spindle in its guide, or similar obstruction, the spring will be compressed a predetermined amount, at which point the two members of the lever mechanism become solid in the closing direction, and so allow the full force of the operating gear to be brought into action. When the valve is in the closed position the spring must be compressed slightly, but not enough to allow the two parts of the lever to become solid. Thus, the whole force of the spring, which would normally be suitably pre-loaded, acts to hold the valve on its seat. This is also the maximum force that the operating gear can apply to the valve spindle when the valve is closed.

Before the valve can be lifted off its seat, the two members of the lever mechanism must become solid in the opening direction. When this occurs the spring load is removed from the valve spindle and becomes locked-up in the operating lever.

The drawings filed with this specification illustrate schematically a valve operating lever mechanism embodying the invention; Fig. 1 is a side elevation and Fig. 2 is a perspective view of a slightly modified form.

The drawings illustrate the case where a valve spindle 1 slides axially in a guide 2, but the invention can readily be adapted to suit other cases. The spindle 1 is connected by a suitable linkage 4 to a lever member 5 which is free to rotate about a fixed pivot 3 and has a spring-carrying extension 6 at its free end. A lever member 7 also pivoted about 3 is connected at one end to the operating gear 7a and has a spring-carrying extension 8 at its other end. In some cases it may be more convenient for the members 5 and 7 to be pivoted about different axes. A spring 9 is carried by the extensions 6 and 8 and is normally held in a pre-loaded condition by a lost-motion linkage connecting members 5, 7, such as the bolt 10 shown in the drawing. When the bolt is carrying the spring load, the gap X between the part 6 and the bolt nut 11 is nil, and the gap Y between abutments 12, 13 on the members 5, 7 is a maximum. Thus any upward movement of member 7 to the right of pivot 3 is transmitted positively through the bolt 10 and the member 5 to the valve spindle 1, whilst any downward movement of member 7 to the right of pivot 3 will normally act through the spring 9 and so through member 5 on the valve spindle.

The mechanism is set so that the valve (not shown) is on its seat before the operating gear has completed its full closing movement. Therefore, the member 5 with its extension 6 remains stationary whilst the lever member 7 with its extension 8 continues to move downwards, and so partly, but not completely, closes the gap Y, and whilst compressing the spring 9 opens up the gap X a corresponding amount. In the valve closed position, therefore, the only force that can be applied by the operating gear to the valve spindle is governed by the amount of spring force that is available.

As the operating lever member 7 is moved upwards, there can be no corresponding movement of the valve spindle until the gap X becomes nil, at which point the spring load is transferred from the valve spindle to the bolt 10. Thereafter, as the member 8 continues to move upwards, it acts positively through the bolt 10 and the lever member 5 and so lifts the valve.

If when closing the valve, there is undue friction between the valve spindle 1 and its guide 2, or there is some other obstruction, the member 5 will remain stationary until such time as the member 7 has compressed the spring 9 sufficiently to close the gap Y, and so allow the full force of the operating gear to act positively on the member 5 to close the valve. It is appreciated that if the spring, plus any closing force the results from the pressure of the fluid inside the valve, is insufficient to overcome this friction, the operating gear will not be able to complete the actual closing of the valve, but this would be an abnormal condition and applies to any valve that is closed by spring force. To prevent damage under these conditons a definite stop or arresting device is incorporated in the operating gear. When gap Y is closed the spring is exerting its maximum force in the closing direction; but if this is not sufficent to overcome the obstruction, the stop incorporated in the operating gear prevents positive closure of the valve. Positive closure must be avoided as this may damage the valve seats and overstrain the mechanism. In the modification of Figure 2, the bolt 10 is located between the spring 9 and abutments 12 and 13. The operation of this embodiment is the same as that of Figure 1 and further description thereof is consequently not required.

What we claim is:

1. Lever mechanism adapted for use in transmitting movement from an operating gear to the valve stem of a fluid control valve, comprising in combination a pair of pivoted members, one of said members being adapted for connection to the said operating gear, means connecting the other of said members to said valve stem for opening and closing said valve, a loading spring operatively connected between said two members whereby a closing force applied by said operating gear to said first member is initially transmitted from said first member to said second member to bias said valve to a closing position, said two pivoted members having opposing abutments which normally separated by the bias of said spring but are brought into contact when the closing force applied to said spring exceeds a predetermined amount, whereby a positive closing force is applied to said valve, and a lost-motion connection between said two members which acts to limit the gap between said abutments and to absorb the loading force of said spring, whereby when said operating gear is moved in a direction to open said valve, the spring load is removed from said valve and said two members act as a solid unit.

2. Lever mechanism according to claim 1 in which said pivoted members each have an end portion provided with a spring seating, said seatings facing each other and receiving a compression spring therebetween, said spring basing said end portions apart.

3. Lever mechanism according to claim 1 in which said lost-motion connection includes aligned holes in said pivoted members and a bolt which passes through said aligned holes, said bolt limiting the separation of said abutments against the bias of said spring.

4. Lever mechanism according to claim 1 in which said two members are pivoted about a common axis.

5. Lever mechanism adapted for use in transmitting movement from an operating gear to a fluid control valve, comprising, in combination, a valve operating spindle, a lever member pivotally mounted at one end on a shaft, a spring seating formed on the other end of said member, linkage connecting said valve spindle to said member at a point intermediate said ends, said member provided with a bolt hole adjacent said seating, an operating lever pivotally mounted intermediate its ends on said shaft, one end of said lever being formed as a spring seating and overlapping said seating on said member, a compression spring carried by said seatings, a bolt hole in said lever in axial alignment with the hole in said member, said member and said lever having opposing abutment faces adjacent said overlapping ends, and a bolt passing through said aligned holes, said bolt providing a lost-motion connection between said member and said lever and limiting the separation between said abutment faces against the bias of said spring.

6. Lever mechanism according to claim 5, wherein said bolt is located between said spring and said abutment faces.

7. Lever mechanism according to claim 5, wherein said spring is located between said bolt and said abutment faces.

8. In a lever mechanism for use in shifting a valve operating stem between open and closed positions, a lever member, pivot means swingably mounting said lever member near one end thereof, an operating lever, pivot means swingably mounting said operating lever intermediate the ends thereof, a loading spring operatively connecting the other of said ends of said lever member to said operating lever in predetermined spaced relation to said operating lever pivot means to swingably urge said operating lever and said lever member in opposed directions, said spring being compressible between said operating lever and said lever member by movement of said operating lever toward a predetermined position corresponding to closed position of said valve stem to thereby urge said lever member in a predetermined direction, means operatively connecting said valve operating stem to said lever member for shifting said operating valve stem in response to movement of said lever member and connecting means automatically rigidly coupling said operating lever and said lever member together so that said operating lever and said lever member are pivoted as a rigid unit when said operating lever is pivoted towards a position corresponding to open position of said valve operating stem, said connecting means being operative when as operating lever and said lever member are pivoted as a rigid unit to render the biasing force of said spring ineffectual in urging said lever member toward a position corresponding to closed position of said valve stem.

References Cited in the file of this patent

UNITED STATES PATENTS

| 1,791,819 | Kull et al. | Feb. 10, 1931 |
| 2,302,723 | Symons | Nov. 24, 1942 |
| 2,580,717 | Ballou | Jan. 1, 1952 |
| 2,660,901 | Latzen | Dec. 1, 1953 |